United States Patent
Nakahara et al.

(10) Patent No.: US 10,305,599 B2
(45) Date of Patent: May 28, 2019

(54) OPTICAL TRANSMITTER MODULE

(71) Applicant: Oclaro Japan, Inc., Sagamihara, Kanagawa (JP)

(72) Inventors: Kouji Nakahara, Tokyo (JP); Hiroaki Inoue, Saitama (JP)

(73) Assignee: Oclaro Japan, Inc., Kanagawa (JP)

( * ) Notice: Subject to any disclaimer, the term of this patent is extended or adjusted under 35 U.S.C. 154(b) by 0 days.

(21) Appl. No.: 15/805,184

(22) Filed: Nov. 7, 2017

(65) Prior Publication Data
US 2018/0159631 A1 Jun. 7, 2018

(30) Foreign Application Priority Data

Dec. 6, 2016 (JP) ................................. 2016-236938

(51) Int. Cl.
| | |
|---|---|
| *H04B 10/54* | (2013.01) |
| *H04J 14/02* | (2006.01) |
| *H04J 14/06* | (2006.01) |
| *H04B 10/532* | (2013.01) |
| *H04B 10/572* | (2013.01) |

(52) U.S. Cl.
CPC ........... *H04B 10/54* (2013.01); *H04B 10/532* (2013.01); *H04J 14/02* (2013.01); *H04J 14/06* (2013.01); *H04B 10/572* (2013.01)

(58) Field of Classification Search
CPC ....... H04B 10/54; H04B 10/572; H04J 14/06; H04J 14/02
USPC .......................................................... 398/65
See application file for complete search history.

(56) References Cited

U.S. PATENT DOCUMENTS

| | | | | |
|---|---|---|---|---|
| 7,941,011 B2* | 5/2011 | Doi | ....................... | H04B 10/505 385/1 |
| 8,380,085 B2* | 2/2013 | Gupta | ................... | H04B 10/541 359/237 |
| 8,588,621 B2* | 11/2013 | Dahan | .................. | H04B 10/541 359/238 |
| 8,639,196 B2* | 1/2014 | Sorrells | ..................... | H03C 5/00 455/102 |

(Continued)

FOREIGN PATENT DOCUMENTS

| | | |
|---|---|---|
| JP | 63-005633 A | 1/1988 |
| JP | 2015-207803 A | 11/2015 |

*Primary Examiner* — Juan A Torres
(74) *Attorney, Agent, or Firm* — Mattingly & Malur, PC

(57) ABSTRACT

In an optical transmitter module for combining three or more optical signals different in intensity with an optical multiplexer to generate a PAM signal, the influence of the beat noise and the chromatic dispersion due to the difference in wavelength is reduced. The optical transmitter module includes first through third optical signal sources adapted to output respective optical signals binary intensity modulated with different amplitude from each other, and a combining section. The combining section has a wavelength multiplexer adapted to wavelength-multiplex a plurality of input optical signals having different wavelengths from each other while keeping the respective polarization states, and a polarization multiplexer adapted to polarization-multiplex a pair of input optical signals having respective polarization states perpendicular to each other, and the combining section combines the input optical signals from the first through third optical signal sources with each other to generate a PAM8 signal.

14 Claims, 8 Drawing Sheets

(56) References Cited

U.S. PATENT DOCUMENTS

2003/0123122 A1\* 7/2003 Nakamura ............ G02F 1/0327
359/248
2009/0324247 A1\* 12/2009 Kikuchi .................. G02F 1/225
398/159

\* cited by examiner

OPTICAL TRANSMITTER MODULE

CROSS-REFERENCE TO RELATED APPLICATION

The present application claims priority from Japanese application JP2016-236938 filed on Dec. 6, 2016, the content of which is hereby incorporated by reference into this application.

BACKGROUND OF THE INVENTION

1. Field of the Invention

The present invention relates to an optical transmitter module, and in particular to a technology of generating a multi-level light intensity modulation signal of eight or more levels.

2. Description of the Related Art

In recent years, the communications traffic of the Internet communication goes on increasing due to the explosive spread of portable data communication equipment such as a smartphone. A large fraction of the high-speed and large capacity information transmission corresponding to the increase in the communications traffic is realized by the optical fiber transmission, and it is desired to speed up the transmission rate of the optical fiber transmission line in the length of about several hundreds of meters for connecting the devices to each other, and the length of several kilometers through several tens of kilometers for realizing the internal and external connection of the datacenter. The representative of the existing high-capacity transmission standard is the 100 gigabit Ethernet (100 GbE) (Ethernet is a registered trademark) established in 2010 as IEEE 802.3ba. Further, in order to deal with a further increase in traffic, there has been started the standards work of 400 gigabit Ethernet (400 GbE).

In such high-speed, large-capacity communication, in order to overcome the limitation of the operation speed of a laser light source and a light modulator, there has been studied the application of the multi-level modulation instead of the binary modulation of the related art. The binary modulation is for making the logic "1" and the logic "0" of the binary information signal to be transmitted correspond respectively to the maximum and the minimum of the light intensity. In contrast, one of the multi-level modulations makes the multi-level information signal to be transmitted correspond to the multiple levels using intermediate levels between the maximum and the minimum. For example, in the 400 GbE, there is used PAM4 as a quaternary pulse amplitude modulation.

Regarding the PAM, in JP 2015-207803 A, there is disclosed a technology of converting a digital signal into a voltage signal of multiple levels using a digital analog converter (DAC), and driving the light modulator using the voltage signal as a modulation signal to thereby make the multi-level light intensity modulation possible. Further, in JP 63-5633 A, as a technology for realizing the multi-level light intensity modulation without using the DAC, there is shown a system of obtaining the PAM4 signal by combining two optical signals, which are obtained by the binary intensity modulation with respective amplitude different from each other, with an optical multiplexer.

SUMMARY OF THE INVENTION

In the future, the modulation system with a larger number of levels than PAM4 such as PAM8 with the octal level or PAM16 with the hexadecimal level can be required to be put into practical use in order to deal with a further increase in the communications traffic.

In the communication of the PAM system, it is desirable that the intervals between the levels of the optical output signal are equal to each other for improving the resolution of the amplitude detection. However, in the system of inputting the multi-level modulation signal to the light modulator to generate the multi-level optical output signal as the system using the DAC described above, it is not necessarily easy to control the multiple levels of the modulation signal with accuracy so that the intervals of the output levels become equal to each other. In particular, an electrooptic modulator such as a Mach-Zehnder (MZ) modulator or an electro-absorption (EA) modulator used for the optical fiber communication, or a semiconductor laser generally has nonlinear modulation characteristics. Therefore, there is a problem that the intervals of the levels of an electrical signal used as the modulation signal basically become unequal to each other, and therefore, a modulation signal generation circuit for making the levels of the optical output signal equal in interval to each other becomes complicated, and grows in size. For example, in the case of the multi-level PAM modulation using the DAC, it is necessary to use the DAC large in effective number of bits (ENOB) in order to compensate the nonlinearity. However, since the processing load of the DAC also increases, and the ENOB decreases due to the increase in transmission rate, it can be a problem to configure the DAC having the sufficient ENOB for the nonlinearity compensation.

In this regard, in the system of combining a plurality of optical signals different in intensity with the optical multiplexer to generate the PAM signal, each of the optical signals to be combined has the binary level, and only has one interval between the levels, and is therefore hard to be affected by the nonlinearity of the modulation characteristics described above, and thus, the control of the multiple levels in the optical output signal is relatively easy. In contrast, in that system, it is ideal, but is difficult in reality, to make the wavelengths of the plurality of optical signals to be combined equal to each other, and therefore, the beat noise generated due to the difference in wavelength and the chromatic dispersion in the fiber transmission can affect the code quality (transmission quality).

Here, the number of optical signals to be combined increases and decreases in accordance with the number of levels of the multiple levels. For example, in the PAM8, three optical signals different in intensity from each other become necessary, and in the PAM16, four optical signals become necessary. In the case in which the number of optical signals to be combined with each other is large, since the influence of the difference in wavelength described above can also become significant, it becomes a problem to deal with the influence.

The problem will further be described. Regarding the beat noise in the wavelength multiplexing, it is possible to avoid the degradation of the code quality of the PAM signal by providing a certain wavelength difference between the optical signals to be multiplexed. However, if it is attempted to provide the wavelength difference with which the influence of the beat noise can be avoided in an arbitrary combination of the plurality of optical signals, there arises a problem that the larger the number of the optical signals becomes, the larger the range, in which the wavelengths of the optical signals are set, becomes, and thus, the more significant, the influence of the chromatic dispersion in the fiber transmission becomes. In other words, the chromatic dispersion becomes larger in the case of generating the PAM8 signal from the three-wavelength optical signals than in the case of generating the PAM4 signal by performing the wavelength multiplexing on the two-wavelength optical signals, and in the case of generating the PAM16 from the four-wavelength optical signals, the chromatic dispersion is apt to become much larger.

It should be noted that although the beat noise does not occur in the orthogonal polarization multiplexing, it is not possible to set the three or more optical signals to the state in which the polarized waves are perpendicular to each other. Therefore, it is not achievable to generate the PAM signal with the octal or more levels only by the polarization multiplexing.

The inventors have found out the fact that the problem described above exists with respect to the generation of the PAM signal with octal or more levels by wave multiplexing, and are given thought to the invention. Therefore, an object of the invention is to solve the problems described above due to the difference in wavelength in the optical transmitter module for combining the three or more optical signals different in intensity with the optical multiplexer to generate the PAM signal.

(1) An optical transmitter module according to the invention includes first through n-th optical signal sources (n denotes a natural number no smaller than 3) adapted to output respective optical signals binary intensity modulated with different amplitude from each other, and a combining section adapted to combine a plurality of input optical signals to generate a single output optical signal, the combining section includes a wavelength multiplexer adapted to wavelength-multiplex a plurality of input optical signals having different wavelengths from each other while keeping the respective polarization states, and a polarization multiplexer adapted to polarization multiplex a pair of input optical signals having respective polarization states perpendicular to each other, and the combining section combines the input optical signals from the first through n-th optical signal sources to generate an output optical signal pulse width modulated into $2^n$ levels.

(2) In the optical transmitter module according to (1) described above, it is preferable to have a configuration in which defining a light speed as $C_0$ and a modulation rate of the optical signal as BR, wavelengths $\lambda_1$, $\lambda_2$ ($\lambda_1 < \lambda_2$) of the optical signals of two of the optical signal sources to be multiplexed with each other by the wavelength multiplexer fulfills the following.

$$c_o\left(\frac{1}{\lambda_1} - \frac{1}{\lambda_2}\right) \geq 2BR$$

(3) In the optical transmitter module according to one of (1) and (2) described above, it is preferable to have a configuration in which an upper limit wavelength and a lower limit wavelength of the first through n-th optical signals are defined respectively as $\lambda_M + \Delta\lambda$, $\lambda_M - \Delta\lambda$, a difference in group delay time between light with the upper limit wavelength and light with the lower limit wavelength in the output optical signal of the optical transmitter module having been transmitted through an optical transmission channel as much as a distance L is defined as $\Delta\tau$, and the upper limit wavelength and the lower limit wavelength fulfill a condition that $\Delta\tau$ defined as follows (here, $\lambda_0$ denotes a zero-dispersion wavelength of the optical transmission channel, S denotes a tilt of a chromatic dispersion coefficient of the optical transmission channel with respect to a wavelength) becomes no higher than a predetermined allowable value with respect to the distance L determined in advance.

$$\Delta\tau = 2LS\Delta\lambda(\lambda_0 - \lambda_M)$$

(4) In the optical transmitter module according to any one of (1) through (3) described above, it is possible to adopt a configuration in which the n is 3, the first optical signal source and the second optical signal source respectively output optical signals having respective wavelengths different from each other, and respective polarization states same as each other, the third optical signal source outputs an optical signal having a polarization state perpendicular to those of the first optical signal source and the second optical signal source, the wavelength multiplexer multiplexes the optical signal of the first optical signal source and the optical signal of the second optical signal source with each other, and the polarization multiplexer multiplexes an output optical signal of the wavelength multiplexer and the optical signal of the third optical signal source with each other.

(5) In the optical transmitter module according to any one of (1) through (3) described above, it is possible to adopt a configuration in which the n is 3, the first optical signal source and the second optical signal source respectively output optical signals having respective wavelengths different from each other, and respective polarization states same as each other, the third optical signal source outputs an optical signal having a polarization state perpendicular to those of the first optical signal source and the second optical signal source, the polarization multiplexer multiplexes the optical signal of the second optical signal source and the optical signal of the third optical signal source with each other, and the wavelength multiplexer multiplexes an output optical signal of the polarization multiplexer and the optical signal of the first optical signal source with each other.

(6) In the optical transmitter module according to one of (4) and (5) described above, it is preferable that relative intensities of components of optical signals of the optical signal sources in the output optical signal of the combining section is 1, 2, and 4.

(7) In the optical transmitter module according to any one of (1) through (3) described above, it is possible to adopt a configuration in which the n is 4, the first optical signal source and the second optical signal source respectively output optical signals having respective wavelengths different from each other, and a first polarization state, the third optical signal source and the fourth optical signal source respectively output optical signals having respective wavelengths different from each other, and a second polarization state perpendicular to the first polarization state, the wavelength multiplexer includes a first wavelength multiplexer adapted to multiplex the optical signal of the first optical signal source and the optical signal of the second optical signal source with each other, and a second wavelength multiplexer adapted to multiplex the optical signal of the third optical signal source and the optical signal of the fourth optical signal source with each other, and the polarization multiplexer multiplexes an output optical signal of the first wavelength multiplexer and an output optical signal of the second wavelength multiplexer with each other.

(8) In the optical transmitter module according to any one of (1) through (3) described above, it is possible to adopt a configuration in which the n is 4, the first optical signal source and the third optical signal source respectively output optical signals having respective wavelengths different from each other, and a first polarization state, the second optical signal source and the fourth optical signal source respectively output optical signals having respective wavelengths different from each other, and a second polarization state perpendicular to the first polarization state, the polarization multiplexer includes a first polarization multiplexer adapted to multiplex the optical signal of the first optical signal source and the optical signal of the second optical signal source with each other, and a second polarization multiplexer adapted to multiplex the optical signal of the third optical signal source and the optical signal of the fourth optical signal source with each other, and the wavelength multiplexer multiplexes an output optical signal of the first polarization multiplexer and an output optical signal of the second polarization multiplexer with each other.

(9) In the optical transmitter module according to any one of (1) through (3) described above, it is possible to adopt a configuration in which the n is 4, the first through third signal sources respectively output optical signals having respective wavelengths different from each other, the fourth optical signal source outputs an optical signal having a polarization state perpendicular to a polarization state of the third optical signal source, the polarization multiplexer multiplexes the optical signal of the third optical signal source and the optical signal of the fourth optical signal source with each other, and the wavelength multiplexer includes a first wavelength multiplexer adapted to multiplex the optical signal of the first optical signal source and the optical signal of the second optical signal source with each other, and a second wavelength multiplexer adapted to multiplex the output optical signal of the polarization multiplexer and the output optical signal of the first wavelength multiplexer with each other.

(10) In the optical transmitter module according to any one of (1) through (9) described above, it is possible to adopt a configuration in which one of two optical signal sources adapted to output optical signals having respective polarization states perpendicular to each other has a polarization rotation device adapted to provide an output optical signal of the one of the two optical signal sources with a polarization state perpendicular to that of the other of the two optical signal sources.

(11) In the optical transmitter module according to any one of (1) through (10) described above, it is possible that the optical signal source is a semiconductor optical element having a distributed-feedback laser and an electroabsorption modulator.

(12) In the optical transmitter module according to any one of (4) through (6) described above, it is possible to adopt a configuration in which in a case in which the modulation rate BR of the optical signal is 28 G Baud, the allowable value of the difference $\Delta\tau$ of the group delay time between the upper limit wavelength and the lower limit wavelength of the optical signal is set to $\frac{1}{5}$ of an inverse of the modulation rate BR when a transmission distance L in an optical transmission channel is 2 kilometers (km), the optical transmission channel is an optical fiber having a zero-dispersion wavelength $\lambda_0$ of 1310 nanometers (nm), and a tilt S with respect to the wavelength of the chromatic dispersion coefficient of $8.7 > 10^{-14}$ sec/km·nm$^2$, wavelengths $\lambda_1$, $\lambda_2$, and $\lambda_3$ of the respective first through third optical signal sources fulfill the following.

$$1300.9 \text{ nm} \le \lambda_1 \le 1304.84 \text{ nm}$$

$$1305.16 \text{ nm} \le \lambda_2 \le 1309.1 \text{ nm}$$

$$1300.9 \text{ nm} \le \lambda_3 \le 1309.1 \text{ nm}$$

According to the invention, it is possible to obtain the optical transmitter module capable of generating the PAM signal having preferable code quality while having multiple levels more than PAM4.

DETAILED DESCRIPTION OF THE INVENTION

Some embodiments of the invention will hereinafter be described based on the accompanying drawings.

First Embodiment

Figure 1:
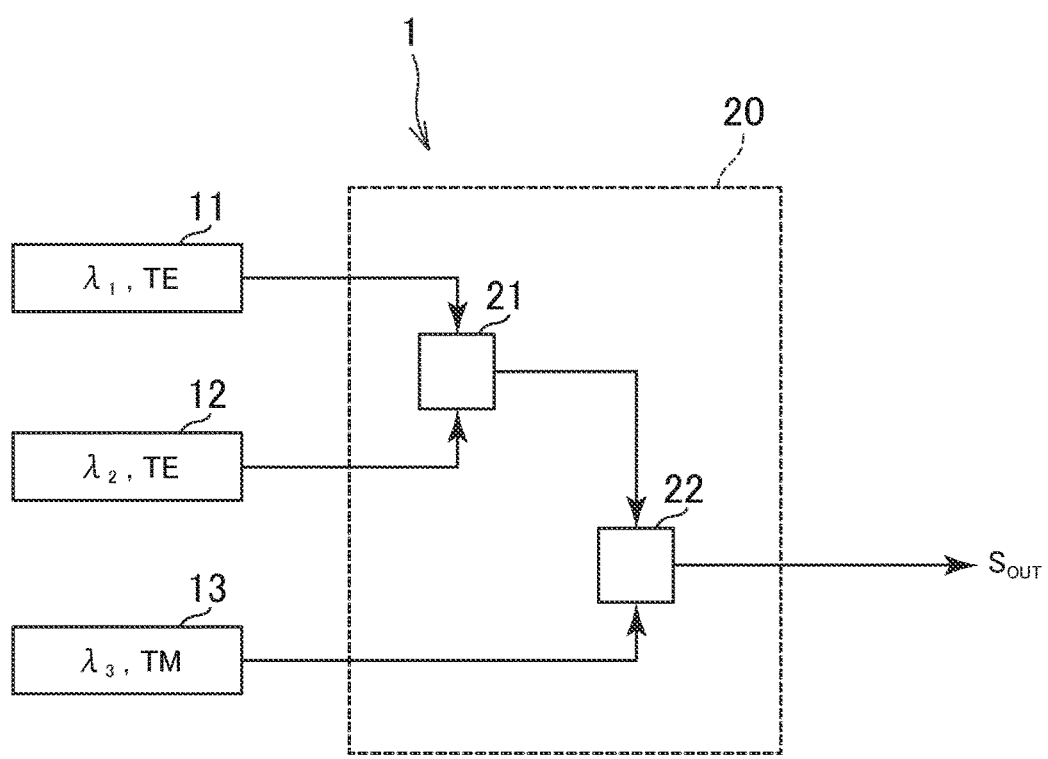
FIG. 1 is a schematic diagram showing a schematic configuration of an optical transmitter module according to a first embodiment of the invention.

The optical transmitter module 1 according to the first embodiment is used for the optical communication using, for example, an optical fiber as the transmission channel, and generates the PAM8 signal from three optical signals to output the PAM8 signal to the optical transmission channel. FIG. 1 is a schematic diagram showing a schematic configuration of the optical transmitter module 1. The optical transmitter module 1 has a first optical signal source 11, a second optical signal source 12, a third optical signal source 13, and a combining section 20. The combining section 20 has a wavelength multiplexer 21 and a polarization multiplexer 22, and combines the input optical signals from the optical signal sources 11, 12, 13 with each other to generate one output optical signal $S_{OUT}$. It should be noted that in order to transmit the optical signals between the components in the optical transmitter module 1, the discrete components are connected to each other with optical fibers, and the integrated components are connected to each other with waveguides. It should be noted that the connection between the discrete components is not limited to the above, but it is also possible to achieve the connection with a spatial optical system using a lens, a mirror, and so on or a waveguide formed only of a semiconductor instead of the optical fiber or the waveguide.

The optical signal sources 11, 12, 13 generate the optical signals, on which the binary intensity modulation is performed with the respective amplitudes different from each other, and then output the optical signals to the combining section 20. The wavelengths of the optical signals of the respective optical signal sources 11, 12, and 13 are denoted by $\lambda_1$, $\lambda_2$, and $\lambda_3$. The optical signal sources 11, 12 output the optical signals having the same polarization state (referred to as a TE mode for the sake of convenience) as each other, and the optical signal source 13 outputs the optical signal in the polarization state (referred to as a TM mode for the sake of convenience) perpendicular to those of the optical signal sources 11, 12.

The wavelength multiplexer 21 performs the wavelength multiplexing on the plurality of input optical signals having respective wavelengths different from each other while keeping the respective polarization states. In contrast, the polarization multiplexer 22 performs the polarization multiplexing on the pair of input optical signals having the polarization states perpendicular to each other. In the present embodiment, the wavelength multiplexer 21 performs the wavelength multiplexing on the optical signals in the TE mode from the respective optical signal sources 11, 12 to generate the optical signal in the TE mode including the two optical signals as the components. Further, the polarization multiplexer 22 performs the polarization multiplexing on the optical signal generated by the wavelength multiplexer 21 and the optical signal from the optical signal source 13 to generate the optical signal including the optical signal from the wavelength multiplexer 21 as the TE mode component, and the optical signal from the optical signal source 13 as the TM mode component.

The combining section 20 outputs the optical signal generated by the polarization multiplexer 22 as $S_{OUT}$. The amplitudes of the optical signals of the optical signal sources 11, 12, and 13 are set so that the intensity ratio of the components of the optical signals of the respective optical signal sources in the output optical signal $S_{OUT}$ of the combining section 20 becomes 4:2:1, and thus, the optical transmitter module 1 generates the PAM8 signal. The optical signals generated by the optical transmitter module 1 are output to the optical fiber.

Figure 2:
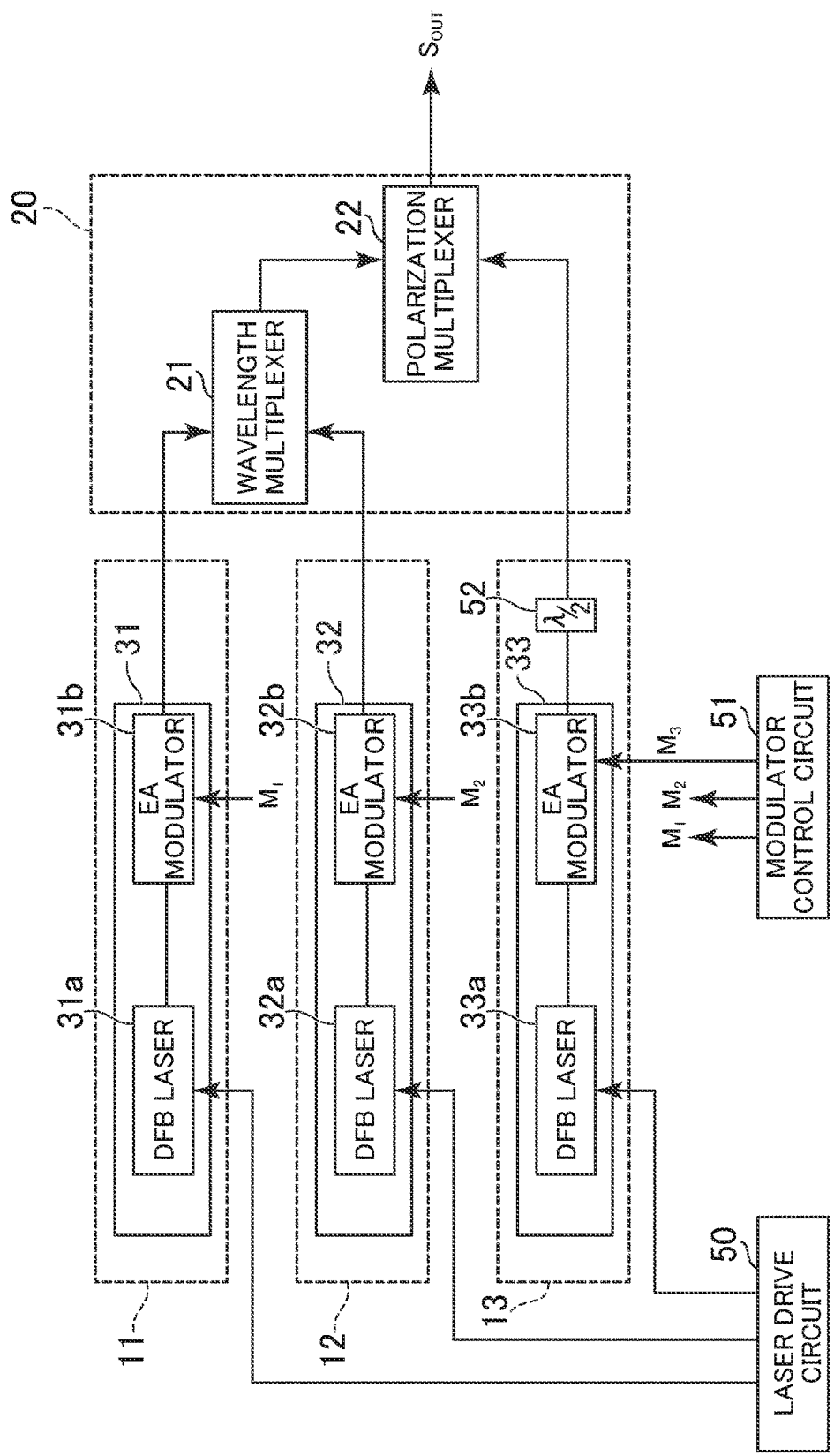
FIG. 2 is a schematic diagram of an outline of the optical transmitter module showing a configuration example of optical signal sources.

FIG. 2 is a schematic diagram of an outline of the optical transmitter module 1 showing a configuration example of the optical signal sources 11, 12, and 13. The optical signal sources 11, 12, and 13 respectively have modulator-integrated semiconductor laser elements 31, 32, and 33. The modulator-integrated semiconductor laser elements 31, 32, and 33 are each an element having a modulator monolithically integrated in front of the semiconductor laser, and each modulate the intensity of the optical signal output by the semiconductor laser with the modulator based on a modulation signal to generate a modulated optical signal. In the present embodiment, the modulator-integrated semiconductor laser element 31 is provided with a distributed feed back (DFB) laser 31a as the semiconductor laser, and is provided with an EA modulator 31b as the modulator. Similarly, the modulator-integrated semiconductor laser element 32 is provided with a DFB laser 32a and an EA modulator 32b, and the modulator-integrated semiconductor laser element 33 is provided with a DFB laser 33a and an EA modulator 33b.

Figure 3:
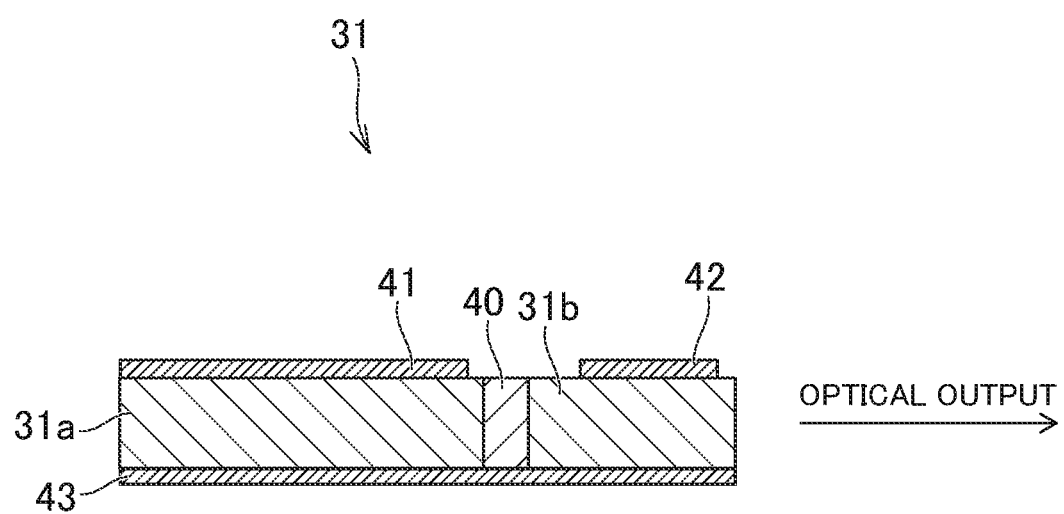
FIG. 3 is a schematic diagram of a vertical cross-sectional structure of a modulator-integrated semiconductor laser element.

FIG. 3 is a diagram schematically showing the structure of the modulator-integrated semiconductor laser elements 31 through 33, and shows the vertical cross-sectional structure of the element 31 along the optical signal path as an example. In FIG. 3, the rightward direction is the exit direction of the optical output, and the DFB laser 31a is disposed on the left side of the element 31, the EA modulator 31b is disposed on the right side, and a connection waveguide 40 is disposed in between. On the upper surface of the modulator-integrated semiconductor laser element 31, there are disposed an electrode 41 of the DFB laser 31a and an electrode 42 of the EA modulator 31b, and on the lower surface thereof, there are disposed a common electrode 43 of the DFB laser 31a and the EA modulator 31b.

Normally, as the semiconductor laser of the modulator-integrated semiconductor laser element, there is used a laser outputting single-wavelength light such as the DFB laser of the present embodiment or the DBR laser. In this regard, the DFB lasers 31a, 32a, and 33a also oscillate in the single mode to generate the light beams the wavelengths of which are basically kept to $\lambda_1$, $\lambda_2$, and $\lambda_3$. For example, the wavelengths $\lambda_1$, $\lambda_2$, and $\lambda_3$ are set to the wavelength in the 1.3 micrometer (μm) band in which the transmission loss in the optical fiber is relatively small.

The optical signal sources 11, 12, and 13 have a laser drive circuit 50 shown in FIG. 2 as a supply source of the drive power to the DFB lasers 31a, 32a, and 33a. It should be noted that in FIG. 2, the laser drive circuit 50 is drawn outside the optical signal sources 11, 12, and 13 for the sake of convenience of illustration. The laser drive circuit 50 is connected to each of the DFB lasers 31a, 32a, and 33a to make the current flow between the electrodes 41, 43. Thus, the current is injected in the active layer of the semiconductor laser element, and thus, the semiconductor laser element emits light.

The amplitude (the intensity) of the optical output of the semiconductor laser element varies with the injected current. The amounts of the currents to be supplied respectively to the DFB lasers 31a, 32a, and 33a from the laser drive circuit 50 are separately set, and thus, the amounts of the currents are set so that the intensity ratio between the components of the optical signals of the respective optical signal sources in the output optical signal $S_{OUT}$ of the combining section 20 becomes 4:2:1 as described above. It should be noted that the intensities of the DFB lasers 31a, 32a, and 33a are preferably set in consideration of the loss in the optical components and the optical transmission channel up to the output end of the combining section 20, and further, can preferably be adjusted in accordance with the loss which can be different by the optical transmitter module 1. In the present embodiment, there are used the light sources (the semiconductor lasers) independent of each other for each of the optical signal sources, but this is not a limitation, and it is also possible to branch the optical output of a single light source to input the result to the respective EA modulators. It should be noted that it has an advantage that it becomes possible to fine adjust the intensity of the optical signal of each of the optical signal sources to provide the independent light source for each of the optical signal sources. In the case of branching the single light source, the intensity of the optical signal of each of the optical signal sources is required to be adjusted by adjusting the voltage to be applied to the EA modulator to thereby adjust the amount of absorption instead of adjusting the optical output of the light source. However, in the case of changing the voltage to be applied to the EA modulator, the extinction ratio and the frequency characteristics also change at the same time, and it is difficult to obtain the desired optical signal in some cases. By providing the light sources independent of each other for the respective optical signal sources as in the present embodiment, it becomes possible to adjust the optical signal intensity of each of the optical signals sources by adjusting the optical output intensity of the light source. Therefore, it becomes unnecessary to dramatically change the voltage to be applied to the EA modulator, and thus, the influence on the extinction ratio and so on can be suppressed.

The EA modulators 31b, 32b, and 33b are each formed of a semiconductor diode having a pin junction, and in the case in which the p-type semiconductor is connected to the electrode 42 side, the OFF state, in which the optical signal input from the semiconductor laser is absorbed to achieve quenching to thereby reduce the optical output, is realized by applying a negative voltage to the electrode 42. In contrast, if no voltage is applied to the pin junction, the light passes through the EA modulator without being absorbed or quenched, and therefore, an ON state of the optical signal is realized. It is possible for the EA modulator to sufficiently reduce the light intensity in the OFF state compared to the semiconductor laser disclosed in JP 63-5633 A. In the case of the semiconductor laser, the binary optical signal is generated by the state of hardly lighting (the OFF state) and the state of sufficiently lighting (the ON state). However, if the OFF state is defined as the state of hardly lighting, the quality of the optical signal deteriorates. In contrast, it is possible for the OFF state of the EA modulator to realize the extinction state of 10 dB or more compared to the ON state, and to create the state in which the light intensity is lower compared to the OFF state of the semiconductor laser. Therefore, in the case of generating the PAM signal by the EA modulator, there can be obtained an advantage that the extinction ratio is high compared to the case of generating the PAM signal by the semiconductor laser.

The optical transmitter module 1 has a modulator control circuit 51 for generating control signals to the EA modulators 31b, 32b, and 33b. The modulator control circuit 51 is connected to each of the EA modulators 31b, 32b, and 33b, and applies a voltage between the electrodes 42, 43 of each of the EA modulators to control ON/OFF of each of the EA modulators. For example, the modulation signal corresponding to the information to be transmitted is input to the modulator control circuit 51, the modulator control circuit 51 generates a binary control signal $M_1$ for controlling ON/OFF of the EA modulator 31b from the modulation signal, and similarly generates binary control signals $M_2$, $M_3$ to the EA modulators 32b, 33b. For example, the EA modulators 31b, 32b, and 33b are provided with a common configuration, and the modulator control circuit 51 drives each of the EA modulators in the common drive condition. Specifically, the voltage applied when the EA modulators 31b, 32b, and 33b are in the ON state is common to the EA modulators, and the voltage applied when the EA modulators 31b, 32b, and 33b are in the OFF state is common to the EA modulators.

In the PAM8, an amount of information which can be charged on a single symbol is 3 bits, and the modulator control circuit 51 assigns the 3 bits corresponding to the single symbol in the modulation signal to the optical signal sources bit by bit, the optical signal sources each output the optical signal modulated by the EA modulator based on the one bit, and then the combining section 20 combines the respective optical signals of the three optical signal sources into the PAM8 signal. Here, the three optical signals each corresponding to one bit need to be combined into the same symbol, and the timing of generating each of the control signals $M_1$ through $M_3$ to the respective EA modulators generated by the modulator control circuit 51 is adjusted in accordance with the propagation time of the light from the EA modulator to the output end of the combining section 20 so that the three optical signals each corresponding to one bit are combined into the same symbol. It should be noted that in order to make the adjustment described above easy, it is preferable to adopt the configuration in which the propagation time of the light from the EA modulator to the output end of the combining section 20 is roughly the same between the EA modulators.

Further, in order to make the design and manufacture of the elements easy, it is convenient to provide a basically common configuration to the modulator-integrated semiconductor laser elements 31, 32, and 33 except the wavelength. Therefore, in the present embodiment, the common configuration for outputting the light in the TE mode is provided to all of the modulator-integrated semiconductor laser elements of the respective optical signal sources 11, 12, and 13 on the one hand, and the optical signal source 13 is provided with a polarization rotation plate 52 on the other hand. The polarization rotation plate 52 is a ½ wave plate, and rotates the polarization state of the output light as much as 90 degrees with respect to the input light. The optical signal output from the modulator-integrated semiconductor laser element of the optical signal source 13 is input to the polarization rotation plate 52, and the optical signal, the polarization state of which has been changed to the TM mode by the polarization rotation plate 52, is output from the optical signal source 13. It should be noted that besides the polarization rotation plate, it is also possible to adopt other polarization rotation devices in order to change the polarization state. For example, it is also possible to rotate the polarization state by applying stress to the optical fiber.

Although the configuration, in which the optical transmitter module 1 generates the optical signal of the PAM8 from the modulation signal of the three bits corresponding to the single symbol, has already been simply described, the features of the invention in that configuration will further be described hereinafter.

As described above, the three-bit modulation signal is separated bit by bit, and the bits different from each other are input to the EA modulators 31b, 32b, and 33b of the respective optical signal sources 11, 12, and 13. Incidentally, the modulation signal is compliant with the NRZ (Non Return to Zero) system.

Further, as described above, the relative magnitudes of the optical signal components of the respective optical signal sources 11, 12, and 13 in the output optical signal $S_{OUT}$ of the combining section 20 are set to 4, 2, and 1. The intensities of the optical signal components of the respective optical signal sources 11, 12, and 13 in the output optical signal $S_{OUT}$ are hereinafter denoted by $P_1$, $P_2$, and $P_3$.

Here, the value of $P_3$ in the case in which the value of the 1-bit modulation signal input as the control signal $M_3$ to the EA modulator 33b of the optical signal source 13 is "1" is defined as a reference value $P_0$, and the value of $P_3$ in the case in which the value of the modulation signal is "0" is assumed as 0. Further, for example, the values of $P_1$, $P_2$ in the case in which the values of the 1-bit modulation signals input as the control signals $M_1$, $M_2$ to the EA modulators 31b, 32b of the optical signal sources 11, 12 are "1" are respectively defined as $4P_0$, $2P_0$, and the values of $P_1$, $P_2$ in the case in which the value of the modulation signal is "0" are assumed as 0.

Table 1 is a table showing a relationship between the combination of the values of the 1-bit modulation signals respectively input to the EA modulators 31b, 32b, and 33b, and the intensity of the output optical signal $S_{OUT}$ of the combining section 20 with respect to the combination. As shown in Table 1, it is possible to combine the 1-bit NRZ signals different in magnitude from each other output from the three optical signal sources to generate the PAM8 signal.

TABLE 1

| $M_1$ | $M_2$ | $M_3$ | $S_{OUT}$ |
|---|---|---|---|
| "0" | "0" | "0" | 0 |
| "0" | "0" | "1" | Po |
| "0" | "1" | "0" | 2Po |
| "0" | "1" | "1" | 3Po |
| "1" | "0" | "0" | 4Po |
| "1" | "0" | "1" | 5Po |
| "1" | "1" | "0" | 6Po |
| "1" | "1" | "1" | 7Po |

One of the features of the invention is to use both of the wavelength multiplexing and the polarization multiplexing, and the polarization multiplexing is used only with one stage out of the plurality of stages of multiplexing in the case of sequentially synthesizing the three or more optical signals by performing the plurality of stages of multiplexing to generate a single PAM signal. Regarding this feature, the optical transmitter module 1 has a configuration of using the wavelength multiplexing as the first stage out of the two stages of multiplexing, and the polarization multiplexing as the second stage. By using both of the wavelength multiplexing and the polarization multiplexing in such a manner, the number of times of the wavelength multiplexing decreases. Thus, it becomes possible to decrease the number of the wavelengths of the optical signal, or to narrow the range in which the wavelength of the optical signal is set, and it is possible to obtain the advantage of suppressing the chromatic dispersion while avoiding the influence of the beat noise.

The wavelengths $\lambda_1$, $\lambda_2$, and $\lambda_3$ of the optical signals to be multiplexed with each other in the optical transmitter module 1 will be described in further detail.

Since the wavelength multiplexing is performed on the optical signal of the optical signal source 11 and the optical signal of the optical signal source 12 by the wavelength multiplexer 21, the wavelengths $\lambda_1$, $\lambda_2$ are set to $\lambda_1 \ne \lambda_2$ in order to avoid the influence of the beat noise. Here, $\lambda_1 < \lambda_2$ is assumed, and further, the modulation rate of the optical output signal $S_{OUT}$ of the optical transmitter module 1 is assumed as BR (unit: Baud). The condition for preventing the beat noise from affecting the quality of the optical output signal modulated at the modulation rate BR when multiplexing the optical signals with the wavelengths $\lambda_1$, $\lambda_2$ by the wavelength multiplexer 21 is expressed by the following formula. It should be noted that $C_0$ represents the speed of light, and is $3 \times 10^8$ meter/second (m/s).

$$c_o\left(\frac{1}{\lambda_1} - \frac{1}{\lambda_2}\right) \geq 2BR \quad (1)$$

The left-hand side of the formula (1) represents the beat frequency in the case of performing the wavelength multiplexing on the optical signals with the wavelengths $\lambda_1$, $\lambda_2$. The formula (1) is based on the fact that the transmission signal is not affected due to the response speed restriction in the reception side or a high-frequency cutting filter, which is normally inserted, as long as the beat frequency is equal to or higher than twice of the modulation rate BR. Defining the central wavelength of the wavelengths $\lambda_1$, $\lambda_2$ as $\lambda_C$, and $\lambda_1$, $\lambda_2$ as $\lambda_1 = \lambda_C - \Delta\lambda$, $\lambda_2 = \lambda_C + \Delta\lambda$, the following formula is obtained from the formula (1).

$$\left(\frac{2\Delta\lambda}{(\lambda_c - \Delta\lambda)(\lambda_c + \Delta\lambda)}\right) \geq \frac{2BR}{c_o} \quad (2)$$

In the case in which the equal sign is true in the formula (2), the following formula becomes true.

$$\Delta\lambda^2 + \frac{c_o}{BR}\Delta\lambda - \lambda_c^2 = 0 \quad (3)$$

For example, assuming the modulation rate BR as 28 G Baud, and $\lambda_0$ as 1305.0 nm, $\Delta\lambda$, becomes 0.16 nm from the formula (3). Therefore, if the wavelength difference between the two optical signals on which the wavelength multiplexing is performed is equal to or larger than 0.32 nm, it is possible to prevent the information to be transmitted by the optical signal obtained by the multiplex from deteriorating due to the beat noise. It should be noted that the calculation result in the calculation described above and the subsequent calculation is expressed as a value rounded at an appropriate digit.

Similarly, if estimating the wavelength difference ($2\Delta\lambda$) between the two optical signals which can be prevented from being deteriorated by the beat noise with respect to the wavelength range of 1260 through 1320 nm used in the optical signal transmission in the 1300 nm band using the formula (3), there can be obtained $2\Delta\lambda = 0.296$ nm at $\lambda_C = 1260$ nm, and $2\Delta\lambda = 0.325$ nm at $\lambda_C = 1320$ nm in the case of BR=28 G Baud.

As described hereinabove, in order to avoid the influence of the beat noise in the wavelength multiplexing, it is sufficient to provide the wavelength difference between the two optical signals based on the formula (1) or the formula (2). Further, in order to reduce the influence of the chromatic dispersion, it is preferable for the wavelength difference to be small, and the lower limit value is determined from the formula (1) or the formula (2).

The chromatic dispersion will further be described. In the case of transmitting the optical output signal $S_{OUT}$ of the PAM8 with the optical fiber, there occurs the restriction of the oscillation wavelength due to the chromatic dispersion of the optical fiber. The group delay time T due to the chromatic dispersion in the transmission distance L of the optical fiber is expressed by the following formula.

$$\frac{d\tau}{d\lambda} = S(\lambda - \lambda_0)L \quad (4)$$

Here, $\lambda_0$ denotes the zero-dispersion wavelength of the optical fiber, and S denotes the gradient of the dispersion coefficient of the optical fiber to the wavelength. For example, a general single mode optical fiber has the zero-dispersion wavelength around 1310 nm. Therefore, in the calculation example in the present embodiment, $\lambda_0 = 1310$ nm is assumed. The value of S differs by the structure of the optical fiber and the wavelength, but is $S = 8.7 \times 10^{-14}$ s/km·nm$^2$ in an example in the general single mode optical fiber having the zero-dispersion wavelength around 1310 nm, and this value is used in the calculation example of the present embodiment.

Defining the lower limit value, the center value, and the upper limit value of the distribution range of the wavelengths of the plurality of optical signals to be multiplexed as $\lambda_L$, $\lambda_M$, and $\lambda_U$, and there are assumed $\lambda_L=\lambda_M-\Delta\lambda$, and $\lambda_U=\lambda_M+\Delta\lambda$. The group delay time at each of $\lambda_L$ and $\lambda_U$ is obtained from the formula (4), and the difference in group delay time between the optical signals generated by the multiplex and then output to the optical fiber, namely the difference $\Delta\tau$ between the group delay time at $\lambda_L$ and the group delay time at $\lambda_U$, is expressed by the following formula.

$$\Delta\tau=2LS\Delta\lambda(\lambda_0-\lambda_M) \quad (5)$$

The delay time difference $\Delta\tau$ appears as a jitter between the optical components different in wavelength from each other in the optical output signal $S_{OUT}$. The jitter does not affect the determination of the transmission signal in the transmission distance L as long as, for example, the jitter is equal to or smaller than 1/10 of the inverse of the modulation rate BR. Here, the margin with respect to the jitter due to the group delay is provided in both of the positive and negative directions. Therefore, by replacing the left-hand side of the formula (5) with $\Delta\tau\leq 2/(10\,BR)$, it is possible to obtain the range (and the upper limit value) of $\Delta\lambda$ in which the influence of the chromatic dispersion is allowed.

For example, assuming the modulation rate BR as 28 G Baud, $\lambda_M$ as 1305.0 nm, and L as 2 km, $\Delta\lambda$ becomes 4.1 nm from the formula (5). Therefore, if the difference ($2\Delta\lambda$) between one to be the maximum wavelength $\lambda_U$ and one to be the minimum wavelength $\lambda_L$ out of the wavelengths $\lambda_1$, $\lambda_2$, and $\lambda_3$ of the optical signals is equal to or smaller than 8.2 nm in the optical transmitter module 1, it is possible to prevent the information to be transmitted by the optical signal obtained by the multiplex from being deteriorated by the beat noise.

Therefore, in consideration of both of the condition of the wavelength for avoiding the influence of the beat noise described above and the condition of the wavelength for avoiding the influence of the chromatic dispersion regarding the case of BR=28 G Baud and L=2 km, in the case of setting, for example, $\lambda_C=\lambda_M=1305.0$ nm, it is sufficient to set $\lambda_1$, $\lambda_2$ in the following ranges.

$$1300.9\text{ nm}\leq\lambda_1\leq 1304.84\text{ nm}$$

$$1305.16\text{ nm}\leq\lambda_2\leq 1309.1\text{ nm}$$

In contrast, since the optical signal of the optical signal source 13 having the wavelength $\lambda_3$ is in the polarization state perpendicular to those of the optical signals of the optical signal sources 11, 12 having the wavelengths $\lambda_1$, $\lambda_2$, the beat noise does not occur due to the multiplex with the optical signal components having the wavelengths $\lambda_1$, $\lambda_2$ in the polarization multiplexer 22. Therefore, regarding $\lambda_3$, it is sufficient to consider only the condition of the chromatic dispersion out of the wavelength condition related to the beat noise and the wavelength condition related to the chromatic dispersion of the optical fiber, and it is sufficient to set $\lambda_3$ in the following range.

$$1300.9\text{ nm}\leq\lambda_3\leq 1309.1\text{ nm}$$

When conducting an experiment in the preset condition related to $\lambda_1$, $\lambda_2$, and $\lambda_3$ described above, in the 28 G Baud PAM8, namely 84 Gb/s transmission, there can be obtained the error rate characteristics in which the error floor does not occur up to $10^{-5}$ due to the error rate measurement in the off-line state after the 2 km transmission. According to the characteristics, in the optical transmitter module provided with the forward error correction (FEC), the error free transmission can be obtained.

Figure 4:
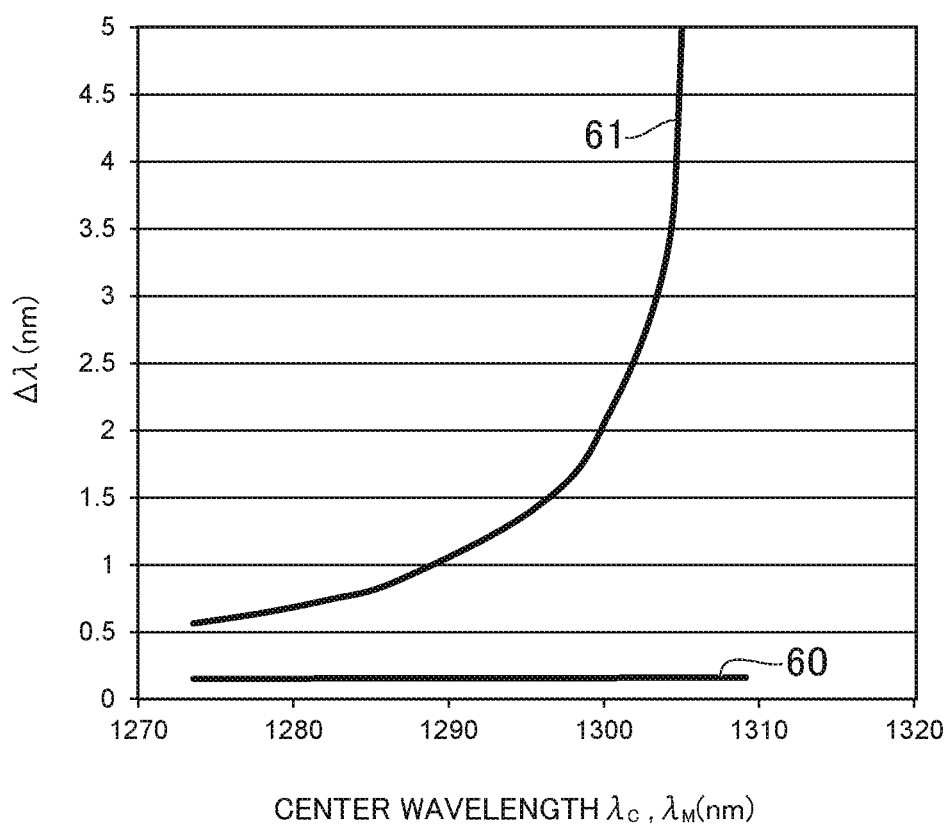
FIG. 4 is a graph showing a variation of $\Delta\lambda$ in the case of varying the central frequency.

FIG. 4 is a graph showing a variation of $\Delta\lambda$ in each of the formula (3) and the formula (5) in the case of varying the center frequency, wherein the vertical axis represents $\Delta\lambda$, and the horizontal axis represents the center frequency. In FIG. 4, other conditions than the center frequency $\lambda_C$, $\lambda_M$ are common to the calculation example described above. Specifically, such conditions are BR=28 G Baud, $\lambda_0=1310$ nm, $S=8.7\times 10^{-14}$ s/km·nm², L=2 km. The curve 60 represents $\Delta\lambda$, obtained from the formula (3), and the curve 61 represents $\Delta\lambda$ obtained from the formula (5). The curve 60 is related to the difference $\Delta\lambda$ of $\lambda_1$, $\lambda_2$ from the center frequency $\lambda_C$, and shows the lower limit based on the condition related to the beat noise. In contrast, the curve 61 is related to the difference $\Delta\lambda$ of $\lambda_1$, $\lambda_2$, and $\lambda_3$ from the center frequency $\lambda_M$, and shows the upper limit based on the condition related to the chromatic dispersion.

For example, in the case of assuming that $\lambda_1$ is the minimum wavelength $\lambda_L$, and $\lambda_2$ is the maximum wavelength $\lambda_U$ out of $\lambda_1$, $\lambda_2$, and $\lambda_3$, $\lambda_C=\lambda_M$ is true, and it is possible to set $\Delta\lambda$, to a value within a range sandwiched by the curve 60 and the curve 61 at an arbitrary position on the horizontal axis of FIG. 4. In other words, by setting the wavelengths of the optical signal sources to $\lambda_1$ ($\equiv\lambda_C-\Delta\lambda$), $\lambda_2$ ($\equiv\lambda_C-\Delta\lambda$) determined in accordance with an arbitrary point ($\lambda_C$, $\Delta\lambda$) in the range sandwiched by the curve 60 and the curve 61, and $\lambda_3$ set within the range of $\lambda_1\leq\lambda_3\leq\lambda_2$ in the optical transmitter module 1, the influence of the beat noise and the chromatic dispersion in the optical output signal $S_{OUT}$ of the optical transmitter module 1 on the signal quality can be kept within the allowable range. It should be noted that the optical transmitter module 1, which fulfills the conditions of the formula (3) and the formula (5) to keep the influence of the beat noise and the chromatic dispersion on the signal quality within the allowable range, can also be configured by setting $\lambda_3$ in the range of $\lambda_3<\lambda_1$, or the range of $\lambda_2<\lambda_3$. However, in the configuration of achieving $\lambda_1\leq\lambda_3\leq\lambda_2$ described above, it is possible to set the difference between $\lambda_1$, $\lambda_2$ to the minimum value capable of avoiding the influence of the beat noise, and set $\lambda_3$ between $\lambda_1$ and $\lambda_2$, and therefore, the configuration of achieving $\lambda_1\leq\lambda_3\leq\lambda_2$ is preferable from a viewpoint that it is possible to narrow the distribution range of the wavelengths $\lambda_1$, $\lambda_2$, and $\lambda_3$ narrower than in the configuration of achieving $\lambda_3<\lambda_1$ or $\lambda_2<\lambda_3$.

Further, if the optical signals on which the polarization combination is performed are not affected by the beat noise even if the same wavelength is provided. Therefore, by adopting the configuration of fulfilling $\lambda_3=\lambda_1$ or $\lambda_3=\lambda_2$ in particular in the configuration of fulfilling $\lambda_1\leq\lambda_3\leq\lambda_2$ described above, it is possible to reduce the wavelengths of the optical signals of the optical signal sources 11 through 13 into the two wavelengths. In this case, it is possible to use an element having the same configuration as either of the modulator-integrated semiconductor laser elements 31, 32 as the modulator-integrated semiconductor laser element 33. In other words, since the types of the modulator-integrated semiconductor laser element used in the optical signal sources 11 through 13 are decreased, it is possible to achieve, for example, reduction in cost of the design and the manufacture of the modulator-integrated semiconductor laser elements.

Although the specific example of the wavelength is hereinabove described regarding the communication with the BR of 28 G Baud in the 1300 nm band related to the optical transmitter module 1, the invention can also be applied to other wavelength bands and other modulation rates BR. For example, in the case of BR=56 G Baud, $\lambda_C=1305$ nm, it is possible to obtain $2\Delta\lambda=0.64$ nm as the minimum wavelength difference between $\lambda_1$, $\lambda_2$ related to the beat noise from the formula (3), and further, it is possible to obtain $2\Delta\lambda=4.1$ nm as the maximum wavelength difference allowed with respect to the chromatic dispersion from the formula (5) in substantially the same condition as in the example described above. From this calculation result, it is sufficient to set $\lambda_1$, $\lambda_2$, and $\lambda_3$ in the optical transmitter module 1 in the following ranges.

$$1302.95 \text{ nm} \le \lambda_1 \le 1304.68 \text{ nm}$$

$$1305.32 \text{ nm} \le \lambda_2 \le 1307.05 \text{ nm}$$

$$1302.95 \text{ nm} \le \lambda_3 \le 1307.05 \text{ nm}$$

Hereinabove, there has been shown the fact that it is possible in the present embodiment to generate the PAM8 signal using once each of the wavelength multiplexing and the polarization combination. Further, there has been shown the fact that it is possible to generate the PAM8 signal superior in transmission characteristics by setting the wavelengths of the three optical signal sources based on the formula (3) and the formula (5).

Second Embodiment

Figure 5:
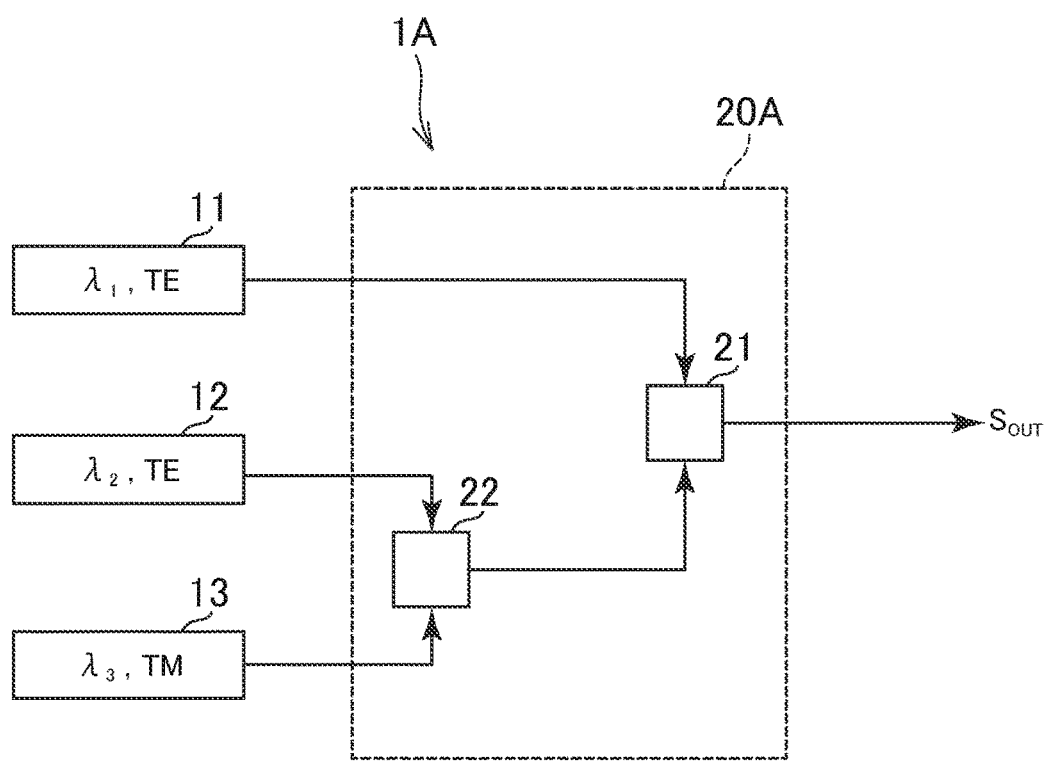
FIG. 5 is a schematic diagram showing a schematic configuration of an optical transmitter module according to a second embodiment of the invention.

FIG. 5 is a schematic diagram showing a schematic configuration of an optical transmitter module 1A as the present embodiment. In the optical transmitter module 1A, the common constituents to the optical transmitter module 1 are denoted by the same reference symbols.

Similarly to the optical transmitter module 1, the optical transmitter module 1A combines the optical signals from the respective optical signal sources 11 through 13 with a combining section 20A to generate one optical output signal $S_{OUT}$, specifically, the PAM8 signal. The point that the single wavelength multiplexer 21 and the single polarization multiplexer 22 are provided is common to the combining section 20A and the combining section 20 of the optical transmitter module 1. In contrast, in the combining section 20A, the order of the wavelength multiplexing and the polarization multiplexing is reversed from that in the combining section 20, and in this point, the optical transmitter module 1A differs from the optical transmitter module 1.

Specifically, in the combining section 20A, the polarization multiplexer 22 performs the polarization multiplex on the optical signals from the optical signal sources 12, 13, and the wavelength multiplexer 21 performs the wavelength multiplex on the optical signal generated by the polarization multiplexer 22 and the optical signal from the optical signal source 11.

It should be noted that the wavelengths $\lambda_1$, $\lambda_2$, and $\lambda_3$ in the optical transmitter module 1A can similarly be determined to those in the optical transmitter module 1.

Third Embodiment

An optical transmitter module 1B according to a third embodiment is, for example, a device used for the optical communication using the optical fiber as the transmission channel similarly to the optical transmitter module 1 described in the first embodiment. The point in which the optical transmitter module 1B is different from the optical transmitter module 1 is that the output optical signal $S_{OUT}$ to the optical transmission channel is not the PAM8 signal but the PAM16 signal, and the optical transmitter module 1B generates the PAM16 signal from four optical signals, and then outputs the PAM16 signal to the optical transmission channel.

Figure 6:
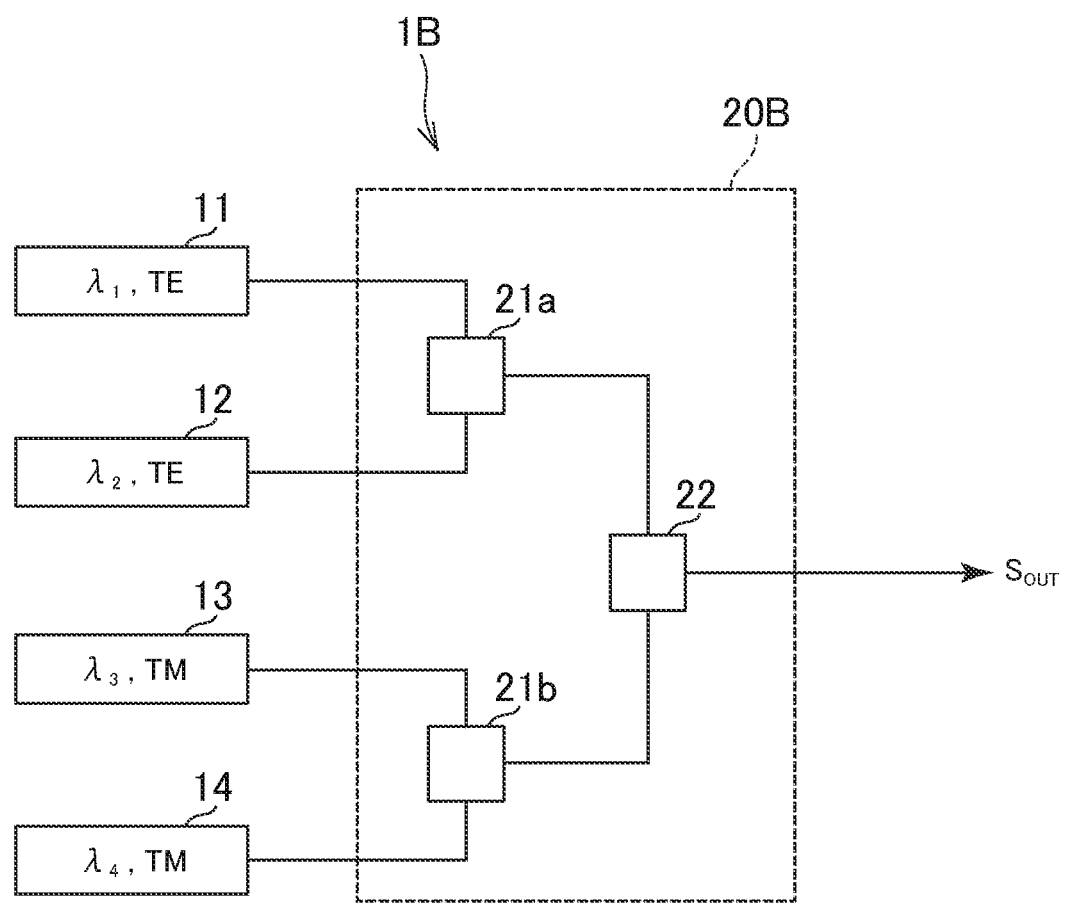
FIG. 6 is a schematic diagram showing a schematic configuration of an optical transmitter module according to a third embodiment of the invention.

FIG. 6 is a schematic diagram showing a schematic configuration of the optical transmitter module 1B. In the optical transmitter module 1B, the description will hereinafter be presented with a focus on a different point from the first embodiment attaching the same reference symbols to the common constituents to the optical transmitter module 1, and basically omitting the description of the common constituents.

The optical transmitter module 1B has the first optical signal source 11, the second optical signal source 12, the third optical signal source 13, a fourth optical signal source 14, and a combining section 20B. Further, although not shown in FIG. 6, similarly to the optical transmitter module 1, the optical transmitter module 1B has the laser drive circuit 50 and the modulator control circuit 51. Similarly to the optical signal sources 11 through 13 shown in FIG. 2, the optical signal source 14 is provided with the modulator-integrated semiconductor laser elements each including the laser element driven by the laser drive circuit 50, and the EA modulator the intensity modulation of which is controlled by the modulator control circuit 51.

The wavelength $\lambda_1$ of the optical signal of the optical signal source 11 and the wavelength $\lambda_2$ of the optical signal of the optical signal source 12 are different from each other, and $\lambda_1 < \lambda_2$ is assumed here. In contrast, the optical signal source 11 and the optical signal source 12 respectively output the optical signals having the same polarization state (assumed as the TE mode) as each other.

Further, the wavelength $\lambda_3$ of the optical signal of the optical signal source 13 and the wavelength $\lambda_4$ of the optical signal of the optical signal source 14 are different from each other, and $\lambda_3 < \lambda_4$ is assumed here. In contrast, the optical signal source 13 and the optical signal source 14 respectively output the optical signals having the polarization state (assumed as the TM mode) perpendicular to those of the optical signal sources 11, 12.

The combining section 20B has two wavelength multiplexers 21a, 21b and the single polarization multiplexer 22, and combines the input optical signals from the optical signal sources 11, 12, 13, and 14 with each other to generate one output optical signal $S_{OUT}$.

The wavelength multiplexer 21a multiplexes the optical signal of the optical signal source 11 and the optical signal of the optical signal source 12 with each other, and the wavelength multiplexer 21b multiplexes the optical signal of the optical signal source 13 and the optical signal of the optical signal source 14 with each other. The polarization multiplexer 22 multiplexes the output optical signal of the wavelength multiplexer 21a and the output optical signal of the wavelength multiplexer 21b with each other.

The intensities of the optical signal sources 11 through 14 are set so that the intensity ratio of the components of the optical signals of the respective optical signal sources in the output optical signal $S_{OUT}$ of the combining section 20B becomes 8:4:2:1. The intensities of the optical signal components of the respective optical signal sources 11 through 14 in the output optical signal $S_{OUT}$ are hereinafter denoted by $P_1$, $P_2$, $P_3$ and $P_4$. Here, the intensities of the respective optical signal sources when the value of the 1-bit modulation signal input to each of the EA modulators of the optical signal sources 11 through 14 is "1" are defined as $P_1=8P_0$, $P_2=4P_0$, $P_3=2P_0$, $P_4=P_0$ using the reference value $P_0$, and the values of $P_1$ through $P_4$ in the case in which the values of the modulation signals are "0" are assumed as 0.

Table 2 is a table showing a relationship between the combination of the values of the 1-bit modulation signals respectively input to the EA modulators of the optical signal sources 11 through 14 as the control signals $M_1$ through $M_4$, and the intensity of the output optical signal $S_{OUT}$ of the combining section 20B with respect to the combination. As shown in Table 2, it is possible to combine the 1-bit NRZ signals different in magnitude from each other output from the four optical signal sources to generate the PAM16 signal.

TABLE 2

| $M_1$ | $M_2$ | $M_3$ | $M_4$ | $S_{OUT}$ |
|---|---|---|---|---|
| "0" | "0" | "0" | "0" | 0 |
| "0" | "0" | "0" | "1" | Po |
| "0" | "0" | "1" | "0" | 2Po |
| "0" | "0" | "1" | "1" | 3Po |
| "0" | "1" | "0" | "0" | 4Po |
| "0" | "1" | "0" | "1" | 5Po |
| "0" | "1" | "1" | "0" | 6Po |
| "0" | "1" | "1" | "1" | 7Po |
| "1" | "0" | "0" | "0" | 8Po |
| "1" | "0" | "0" | "1" | 9Po |
| "1" | "0" | "1" | "0" | 10Po |
| "1" | "0" | "1" | "1" | 11Po |
| "1" | "1" | "0" | "0" | 12Po |
| "1" | "1" | "0" | "1" | 13Po |
| "1" | "1" | "1" | "0" | 14Po |
| "1" | "1" | "1" | "1" | 15Po |

The wavelengths $\lambda_1, \lambda_2, \lambda_3$ and $\lambda_4$ of the optical signals to be multiplexed with each other in the optical transmitter module 1B will be described.

Since the respective optical signals of the optical signal source 11 and the optical signal source 12 are wavelength-multiplexed with each other in the wavelength multiplexer 21a, in order to avoid the influence of the beat noise, a difference is provided between $\lambda_1$ and $\lambda_2$ based on the formula (1) or the formula (2) similarly to the first embodiment.

Similarly, since the respective optical signals of the optical signal source 13 and the optical signal source 14 are wavelength-multiplexed with each other in the wavelength multiplexer 21b, a difference is provided between $\lambda_3$ and $\lambda_4$ based on the formula (1) or the formula (2).

Here, the output of the wavelength multiplexer 21a obtained by multiplexing the optical signals of the optical signal sources 11, 12 with each other and the output of the wavelength multiplexer 21b obtained by multiplexing the optical signals of the optical signal sources 13, 14 with each other are further multiplexed, and the multiplex is the polarization multiplex by the polarization multiplexer 22. Specifically, since the optical signal components of the optical signal sources 11, 12 and the optical signal components of the optical signal sources 13, 14 input to the polarization multiplexer 22 are perpendicular to each other in the polarization state, the beat noise is not caused. Therefore, there is no need to provide such a wavelength difference between $\lambda_1, \lambda_2$ and $\lambda_3, \lambda_4$ as satisfying the formula (1) or the formula (2).

In contrast, it is necessary to set the distribution range of the wavelengths $\lambda_1, \lambda_2, \lambda_3,$ and $\lambda_4$ so that $\Delta\tau$ provided by the formula (5) becomes equal to or lower than the allowable value in order to avoid the influence of the chromatic dispersion.

For example, in the conditions shown in the first embodiment, namely BR=28 G Baud, $\lambda_0$=1310 nm, S=8.7×10$^{-14}$ s/km·nm$^2$, L=2 km, $\lambda_C=\lambda_M$=1305.0 nm, the settable ranges of $\lambda_1, \lambda_2$ become as follows.

1300.9 nm≤$\lambda_1$≤1304.84 nm 1305.16 nm≤$\lambda_2$≤1309.1 nm

Similarly, the settable ranges of $\lambda_3, \lambda_4$ become as follows.

1300.9 nm≤$\lambda_3$≤1304.84 nm 1305.16 nm≤$\lambda_4$≤1309.1 nm

When conducting an experiment in the preset condition related to $\lambda_1, \lambda_2, \lambda_3$ and $\lambda_4$ described above, in the 28 G Baud PAM16, namely 112 Gb/s transmission, there can be obtained the error rate characteristics in which the error floor does not occur up to 2×10$^{-5}$ due to the error rate measurement in the off-line state after the 2 km transmission. According to the characteristics, in the optical transmitter module provided with the forward error correction (FEC), the error free transmission can be obtained.

It should be noted that since there is no need to provide the wavelength difference between $\lambda_1, \lambda_2$ and $\lambda_3, \lambda_4$ as described above, in order to reduce the influence of the chromatic dispersion, it is preferable to set $\lambda_1=\lambda_3$ and $\lambda_2=\lambda_4$.

In the optical transmitter module 1B, there is adopted a configuration in which the optical signal sources 13, 14 generate the optical signals in the TM mode. This configuration is achievable by providing the polarization rotation plate 52 to each of the optical signal sources 13, 14 similarly to the optical signal source 13 of the first embodiment. Here, the configuration in which the polarization rotation plate 52 is inserted between the wavelength multiplexer 21b and the polarization multiplexer 22, and the optical signal sources 13, 14 output the light in the TE mode in the same manner as in the optical signal sources 11, 12 is equivalent to the configuration in which the polarization rotation plate 52 is provided to each of the optical signal sources 13, 14 described above with respect to the features of the invention of generating the PAM signal while avoiding the influence of the beat noise and the chromatic dispersion.

Fourth Embodiment

Figure 7:
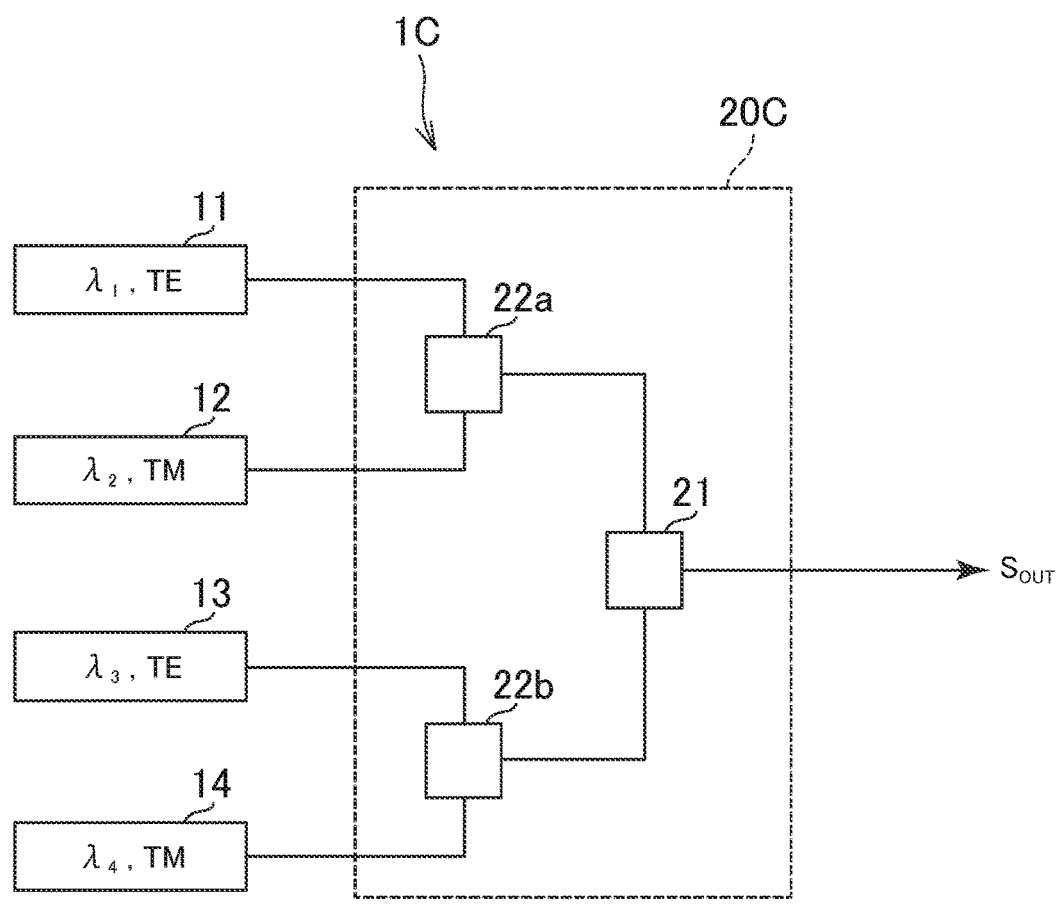
FIG. 7 is a schematic diagram showing a schematic configuration of an optical transmitter module according to a fourth embodiment of the invention.

FIG. 7 is a schematic diagram showing a schematic configuration of an optical transmitter module 1C according to a fourth embodiment. The optical transmitter module 1C is a device for generating the PAM16 signal similarly to the optical transmitter module 1B according to the third embodiment, and in the optical transmitter module 1C, the description will hereinafter be presented with a focus on a different point from the optical transmitter module 1B attaching the same reference symbols to the common constituents to the optical transmitter module 1B, and basically omitting the description of the common constituents.

The wavelength $\lambda_1$ of the optical signal of the optical signal source 11 and the wavelength $\lambda_3$ of the optical signal of the optical signal source 13 are different from each other. In contrast, the optical signal source 11 and the optical signal source 13 respectively output the optical signals having the same polarization state (assumed as the TE mode) as each other.

Further, the wavelength $\lambda_2$ of the optical signal of the optical signal source 12 and the wavelength $\lambda_4$ of the optical signal of the optical signal source 14 are different from each other. In contrast, the optical signal source 12 and the optical signal source 14 respectively output the optical signals having the polarization state (assumed as the TM mode) perpendicular to those of the optical signal sources 11, 13.

The optical transmitter module 1C has a combining section 20C instead of the combining section 20B of the optical transmitter module 1B as a device for generating the single output optical signal $S_{OUT}$ from the optical signals of the optical signal sources 11 through 14. The combining section 20C has two polarization multiplexers 22a, 22b, and the single wavelength multiplexer 21.

The polarization multiplexer 22a multiplexes the optical signal of the optical signal source 11 and the optical signal of the optical signal source 12 with each other, and the polarization multiplexer 22b multiplexes the optical signal of the optical signal source 13 and the optical signal of the optical signal source 14 with each other. The wavelength multiplexer 21 multiplexes the output optical signal of the polarization multiplexer 22a and the output optical signal of the polarization multiplexer 22b with each other.

The respective optical signals of the optical signal source 11 and the optical signal source 12 are polarization-multiplexed with each other in the polarization multiplexer 22a, and therefore the beat noise is not caused. Therefore, there is no need to provide such a wavelength difference between $\lambda_1$ and $\lambda_2$ as satisfying the formula (1) or the formula (2).

Similarly, since the respective optical signals of the optical signal source 13 and the optical signal source 14 are polarization-multiplexed with each other in the polarization multiplexer 22b, there is no need to provide such a wavelength difference between $\lambda_3$ and $\lambda_4$ as satisfying the formula (1) or the formula (2).

In contrast, in the wavelength multiplexer 21, the TE-mode components of the respective output optical signals of the polarization multiplexers 22a, 22b are wavelength-multiplexed with each other, and further, the TM-mode components are wavelength-multiplexed with each other. Specifically, the optical signal component of the optical signal source 11 and the optical signal component of the optical signal source 13 are wavelength-multiplexed with each other, and the optical signal component of the optical signal source 12 and the optical signal component of the optical signal source 14 are wavelength-multiplexed with each other. Therefore, in order to avoid the influence of the beat noise, a difference is provided between $\lambda_1$ and $\lambda_3$ based on the formula (1) or the formula (2), and a difference is provided between $\lambda_2$ and $\lambda_4$ based on the formula (1) or the formula (2).

Regarding the avoidance of the influence of the chromatic dispersion, it is necessary to limit the distribution range of the wavelengths $\lambda_1$, $\lambda_2$, $\lambda_3$ and $\lambda_4$ so that $\Delta\tau$ provided by the formula (5) becomes equal to or lower than the allowable value similarly to the third embodiment.

Since there is no need to provide the wavelength difference between $\lambda_1$ and $\lambda_2$ and between $\lambda_3$ and $\lambda_4$ as described above, in order to reduce the influence of the chromatic dispersion, it is preferable to set $\lambda_1=\lambda_2$ and $\lambda_3=\lambda_4$.

Fifth Embodiment

Figure 8:
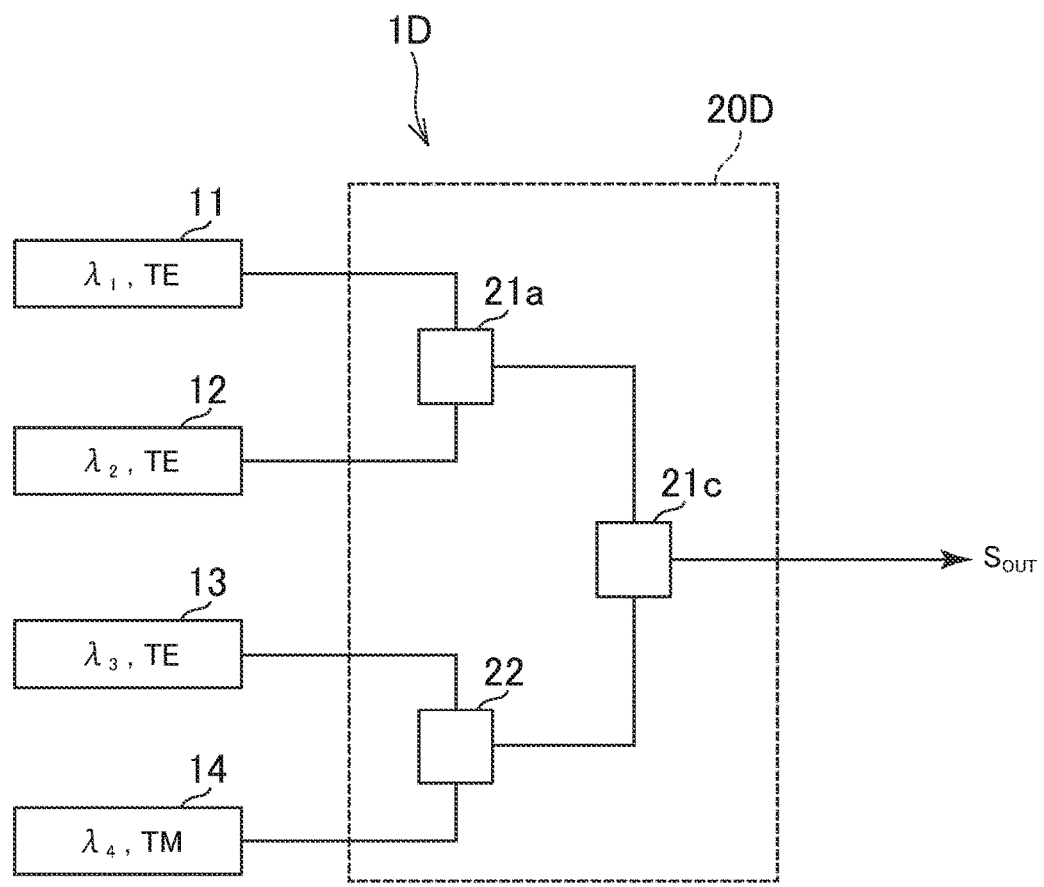
FIG. 8 is a schematic diagram showing a schematic configuration of an optical transmitter module according to a fifth embodiment of the invention.

FIG. 8 is a schematic diagram showing a schematic configuration of an optical transmitter module 1D according to a fifth embodiment. The optical transmitter module 1D is a device for generating the PAM16 signal similarly to the optical transmitter module 1B according to the third embodiment, and in the optical transmitter module 1D, the description will hereinafter be presented with a focus on a different point from the optical transmitter module 1B attaching the same reference symbols to the common constituents to the optical transmitter module 1B, and basically omitting the description of the common constituents.

The wavelength $\lambda_1$, $\lambda_2$, and $\lambda_3$ of the optical signals of the optical signal sources 11 through 13 are different from each other, and $\lambda_1<\lambda_2<\lambda_3$ is assumed here. In contrast, the optical signal sources 11 through 13 respectively output the optical signals having the same polarization state (assumed as the TE mode) as each other.

The optical signal source 14 outputs the optical signal having the polarization state (assumed as the TM mode) perpendicular to those of the optical signal sources 11 through 13.

The optical transmitter module 1D has a combining section 20D instead of the combining section 20B of the optical transmitter module 1B as a device for generating the single output optical signal $S_{OUT}$ from the optical signals of the optical signal sources 11 through 14. The combining section 20D has the polarization multiplexer 22, and two wavelength multiplexers 21a, 21c.

The polarization multiplexer 22 multiplexes the optical signal of the optical signal source 13 and the optical signal of the optical signal source 14 with each other. The wavelength multiplexer 21a multiplexes the optical signal of the optical signal source 11 and the optical signal of the optical signal source 12 with each other, and the wavelength multiplexer 21c multiplexes the output optical signal of the polarization multiplexer 22 and the output optical signal of the wavelength multiplexer 21a with each other.

Since the respective optical signals of the optical signal source 11 and the optical signal source 12 are wavelength-multiplexed with each other in the wavelength multiplexer 21a, in order to avoid the influence of the beat noise, a difference is provided between $\lambda_1$ and $\lambda_2$ based on the formula (1) or the formula (2).

The respective optical signals of the optical signal source 13 and the optical signal source 14 are polarization-multiplexed with each other in the polarization multiplexer 22, and therefore the beat noise is not caused. Therefore, there is no need to provide such a wavelength difference between $\lambda_3$ and $\lambda_4$ as satisfying the formula (1) or the formula (2).

In contrast, in the wavelength multiplexer 21c, the TE-mode component of the output optical signal of the polarization multiplexer 22 and the output optical signal of the wavelength multiplexer 21a are wavelength-multiplexed with each other. Specifically, the optical signal components of the optical signal sources 11 through 13 are wavelength-multiplexed with each other. Therefore, it is necessary to provide a difference for making it possible to avoid the influence of the beat noise between $\lambda_3$ and $\lambda_1$, $\lambda_2$. Here, $\lambda_1<\lambda_2<\lambda_3$ is fulfilled, and further, the necessary difference is provided between $\lambda_1$ and $\lambda_2$ with respect to the multiplexing in the wavelength multiplexer 21a, and therefore, regarding the multiplexing in the wavelength multiplexer 21c, a difference is provided between $\lambda_2$ and $\lambda_3$ based on the formula (1) or the formula (2).

Regarding the avoidance of the influence of the chromatic dispersion, the distribution range of the wavelengths $\lambda_1$, $\lambda_2$, $\lambda_3$ and $\lambda_4$ is limited so that $\Delta\tau$ provided by the formula (5) becomes equal to or lower than the allowable value similarly to the third and fourth embodiments.

It should be noted that it is also possible to make $\lambda_4$ common to either of $\lambda_1$, $\lambda_2$, and $\lambda_3$.

Modified Examples

In the first embodiment, there has been shown the example in which the intensity ratio of the respective optical signal components of the wavelengths $\lambda_1$, $\lambda_2$, and $\lambda_3$ in the optical output signal $S_{OUT}$ of the optical transmitter module 1 is 4:2:1, but the correspondence relationship between the wavelengths $\lambda_1$, $\lambda_2$, and $\lambda_3$ and the intensities $P_0$, $2P_0$, and $4P_0$, and which one of $P_0$, $2P_0$, and $4P_0$ the intensity of the TM-mode optical signal component is set to are arbitrary determined in the first and second embodiments.

Similarly, although in the third embodiment, there has been shown the example in which the intensity ratio of the respective optical signal components of the wavelengths $\lambda_1$, $\lambda_2$, $\lambda_3$ and $\lambda_4$ in the optical output signal $S_{OUT}$ of the optical transmitter module 1B is 8:4:2:1, the correspondence relationship between the wavelengths $\lambda_1$, $\lambda_2$, $\lambda_3$ and $\lambda_4$ and the intensities $P_0$, $2P_0$, $4P_0$, and $8P_0$ of the optical signals is arbitrary in the third through fifth embodiments. Further, it is also arbitrary which one of $P_0$, $2P_0$, $4P_0$, and $8P_0$ the intensity of the optical signal component in the TM mode in the optical output signal $S_{OUT}$ of each of the optical transmitter modules 1B through 1D is set to.

Further, although in each of the embodiments described above, there is shown the configuration in which the EA modulator is used as the modulation device for the light, it is obvious that substantially the same advantage can also be obtained by using the MZ modulator instead of the EA modulator.

Further, the optical components for constituting each of the optical transmitter modules 1, 1A through 1D described above can be one obtained by monolithically integrating some or all of the optical components on a semiconductor substrate, or integrating some or all of the optical components using bonding, or all can be discrete components. Further, although in the above description, the polarization rotation plate 52 is defined as the constituent of the optical signal source 13, the polarization rotation plate 52 can be disposed outside the optical signal source.

Hereinabove, as the embodiments there are described the optical transmitter module for generating the PAM8 signal from the three optical signal sources, and the optical transmitter module for generating the PAM16 signal from the four optical signal sources. Here, the invention can be applied to an optical transmitter module for generating the PAM signal of $2^n$ (n denotes a natural number no smaller than 3) levels from a first through n-th optical signal sources for outputting the optical signals binary intensity modulated with different amplitudes from each other.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical transmitter module comprising:
   first through n-th optical signal sources, where n denotes a natural number equal to or greater than 3, configured to output respective optical signals that are binary intensity modulated with different amplitudes from each other; and
   a combining section configured to combine the optical signals from the first through n-th optical signal sources to generate a single output optical signal,
   wherein the combining section includes:
      a wavelength multiplexer configured to wavelength-multiplex a plurality of input optical signals having different wavelengths from each other while keeping respective polarization states thereof, and
      a polarization multiplexer configured to polarization-multiplex a pair of input optical signals having respective polarization states perpendicular to each other, and
   the combining section is configured to combine the input optical signals from the first through n-th optical signal sources to generate the output optical signal having a pulse width modulated into $2^n$ levels.

2. The optical transmitter module according to claim 1, wherein
   defining a light speed as $C_0$ and a modulation rate of the optical signals as BR, wavelengths $\lambda_1$ and $\lambda_2$ of the optical signals of two of the optical signal sources to be multiplexed with each other by the wavelength multiplexer fulfill $\lambda_1 < \lambda_2$ and the following:

$$c_o\left(\frac{1}{\lambda_1} - \frac{1}{\lambda_2}\right) \geq 2BR.$$

3. The optical transmitter module according to claim 1, wherein
   an upper limit wavelength and a lower limit wavelength of the first through n-th optical signals are defined respectively as $\lambda_M + \Delta\lambda$ and $\lambda_M - \Delta\lambda$,
   a difference in group delay time between light with the upper limit wavelength and light with the lower limit wavelength in the output optical signal of the optical transmitter module having been transmitted through an optical transmission channel as much as a predetermined transmission distance L is defined as $\Delta\tau$, and
   the upper limit wavelength and the lower limit wavelength fulfill a condition that $\Delta\tau$ becomes no higher than a predetermined allowable value with respect to the distance L, and
   a zero-dispersion wavelength of the optical transmission channel is defined as $\lambda_0$, a tilt of a chromatic dispersion coefficient of the optical transmission channel with respect to a wavelength is defined as S, and $\Delta\tau$ fulfills the following:

$$\Delta\tau = 2LS\Delta\lambda(\lambda_0 - \lambda_M).$$

4. The optical transmitter module according to claim 1, wherein
   n is 3,
   the first optical signal source and the second optical signal source respectively output optical signals having respective wavelengths different from each other, and respective polarization states which are the same as each other,
   the third optical signal source outputs the optical signal having a polarization state perpendicular to those of the first optical signal source and the second optical signal source,
   the wavelength multiplexer multiplexes the optical signal of the first optical signal source and the optical signal of the second optical signal source with each other, and
   the polarization multiplexer multiplexes an output optical signal of the wavelength multiplexer and the optical signal of the third optical signal source with each other.

5. The optical transmitter module according to claim 1, wherein
   n is 3,
   the first optical signal source and the second optical signal source respectively output the optical signals having respective wavelengths different from each other, and respective polarization states which are the same as each other,
   the third optical signal source outputs the optical signal having a polarization state perpendicular to those of the first optical signal source and the second optical signal source, the polarization multiplexer multiplexes the optical signal of the second optical signal source and the optical signal of the third optical signal source with each other, and the wavelength multiplexer multiplexes an output optical signal of the polarization multiplexer and the optical signal of the first optical signal source with each other.

6. The optical transmitter module according to claim 1, wherein n is 4, the first optical signal source and the second optical signal source respectively output the optical signals having respective wavelengths different from each other, and a first polarization state, the third optical signal source and the fourth optical signal source respectively output the optical signals having respective wavelengths different from each other, and a second polarization state perpendicular to the first polarization state, the wavelength multiplexer includes a first wavelength multiplexer configured to multiplex the optical signal of the first optical signal source and the optical signal of the second optical signal source with each other, and a second wavelength multiplexer configured to multiplex the optical signal of the third optical signal source and the optical signal of the fourth optical signal source with each other, and the polarization multiplexer is configured to multiplex an output optical signal of the first wavelength multiplexer and an output optical signal of the second wavelength multiplexer with each other.

7. The optical transmitter module according to claim 1, wherein the n is 4, the first optical signal source and the third optical signal source respectively output the optical signals having respective wavelengths different from each other, and a first polarization state, the second optical signal source and the fourth optical signal source respectively output the optical signals having respective wavelengths different from each other, and a second polarization state perpendicular to the first polarization state, the polarization multiplexer includes a first polarization multiplexer configured to multiplex the optical signal of the first optical signal source and the optical signal of the second optical signal source with each other, and a second polarization multiplexer configured to multiplex the optical signal of the third optical signal source and the optical signal of the fourth optical signal source with each other, and the wavelength multiplexer is configured to multiplex an output optical signal of the first polarization multiplexer and an output optical signal of the second polarization multiplexer with each other.

8. The optical transmitter module according to claim 1, wherein n is 4, the first through third signal sources respectively output the optical signals having respective wavelengths different from each other, the fourth optical signal source outputs the optical signal having a polarization state perpendicular to a polarization state of the third optical signal source, the polarization multiplexer is configured to multiplex the optical signal of the third optical signal source and the optical signal of the fourth optical signal source with each other, and the wavelength multiplexer includes a first wavelength multiplexer configured to multiplex the optical signal of the first optical signal source and the optical signal of the second optical signal source with each other, and a second wavelength multiplexer configured to multiplex the output optical signal of the polarization multiplexer and the output optical signal of the first wavelength multiplexer with each other.

9. The optical transmitter module according to claim 1, wherein one of two optical signal sources configured to output the optical signals having respective polarization states perpendicular to each other has a polarization rotation device configured to output the optical signal of the one of the two optical signal sources with a polarization state perpendicular to that of the other of the two optical signal sources.

10. The optical transmitter module according to claim 1, wherein the optical signal sources respectively include a semiconductor optical element having a distributed-feedback laser and an electroabsorption modulator.

11. The optical transmitter module according to claim 4, wherein an intensity ratio of components of the optical signals of the optical signal sources in the output optical signal of the combining section is 1:2:4.

12. The optical transmitter module according to claim 4, wherein an upper limit wavelength and a lower limit wavelength of the first through n-th optical signals are defined respectively as $\lambda_M + \Delta\lambda$ and $\lambda_M - \Delta\lambda$, a difference in group delay time between light with the upper limit wavelength and light with the lower limit wavelength in the output optical signal of the optical transmitter module having been transmitted through an optical transmission channel as much as a predetermined transmission distance L is defined as $\Delta\tau$, and the upper limit wavelength and the lower limit wavelength fulfill a condition that $\Delta\tau$ becomes no higher than a predetermined allowable value with respect to the distance L, and a zero-dispersion wavelength of the optical transmission channel is defined as $\lambda_0$, a tilt of a chromatic dispersion coefficient of the optical transmission channel with respect to a wavelength is defined as S, and $\Delta\tau$ fulfills the following:

$$\Delta\tau = 2LS\Delta\lambda(\lambda_0 - \lambda_M),$$

in a case in which a modulation rate BR of the optical signals is 28 G Baud, the allowable value of the difference $\Delta\tau$ of the group delay time between the upper limit wavelength and the lower limit wavelength of the optical signal is set to ⅕ of an inverse of the modulation rate BR and the transmission distance L in the optical transmission channel is 2 km, and the optical transmission channel is an optical fiber having a zero-dispersion wavelength $\lambda_0$ of 1310 nm, and the tilt S of the chromatic dispersion coefficient is $8.7 \times 10^{-14}$ sec/km·nm$^2$, and wavelengths $\lambda_1$, $\lambda_2$, and $\lambda_3$ of the respective first through third optical signal sources fulfill the following:

1300.9 nm ≤ $\lambda_1$ ≤ 1304.84 nm, 1305.16 nm ≤ $\lambda_2$ ≤ 1309.1 nm, and 1300.9 nm ≤ $\lambda_3$ ≤ 1309.1 nm.

13. The optical transmitter module according to claim 5, wherein
   an intensity ratio of components of the optical signals of the optical signal sources in the output optical signal of the combining section is 1:2:4.

14. The optical transmitter module according to claim 5, wherein
   an upper limit wavelength and a lower limit wavelength of the first through n-th optical signals are defined respectively as $\lambda_M + \Delta\lambda$ and $\lambda_M - \Delta\lambda$,
   a difference in group delay time between light with the upper limit wavelength and light with the lower limit wavelength in the output optical signal of the optical transmitter module having been transmitted through an optical transmission channel as much as a predetermined transmission distance L is defined as $\Delta\tau$, and
   the upper limit wavelength and the lower limit wavelength fulfill a condition that $\Delta\tau$ becomes no higher than a predetermined allowable value with respect to the distance L, and
   a zero-dispersion wavelength of the optical transmission channel is defined as $\lambda_0$, a tilt of a chromatic dispersion coefficient of the optical transmission channel with respect to a wavelength is defined as S, and $\Delta\tau$ fulfills the following:

$$\Delta\tau = 2LS\Delta\lambda(\lambda_0 - \lambda_M),$$

in a case in which a modulation rate BR of the optical signals is 28 G Baud,
   the allowable value of the difference $\Delta\tau$ of the group delay time between the upper limit wavelength and the lower limit wavelength of the optical signal is set to ⅕ of an inverse of the modulation rate BR and the transmission distance L in an optical transmission channel is 2 km,
   the optical transmission channel is an optical fiber having a zero-dispersion wavelength $\lambda_0$ of 1310 nm, and the tilt S of the chromatic dispersion coefficient is $8.7 \times 10^{-14}$ sec/km·nm², and
   wavelengths $\lambda_1$, $\lambda_2$, and $\lambda_3$ of the respective first through third optical signal sources fulfill the following:

1300.9 nm ≤ $\lambda_1$ ≤ 1304.84 nm, 1305.16 nm ≤ $\lambda_2$ ≤ 1309.1 nm, and 1300.9 nm ≤ $\lambda_3$ ≤ 1309.1 nm.

* * * * *